United States Patent [19]

Patterson

[11] 3,918,406
[45] Nov. 11, 1975

[54] CAGE APPARATUS
[75] Inventor: Carol M. Patterson, Houston, Tex.
[73] Assignee: Research Equipment Company, Inc., Bryan, Tex.
[22] Filed: May 13, 1974
[21] Appl. No.: 469,545

[52] U.S. Cl. .................................................. 119/96
[51] Int. Cl.² ........................................ A01K 29/00
[58] Field of Search ................... 119/96, 98, 99, 17

[56] References Cited
UNITED STATES PATENTS

| | | |
|---|---|---|
| 2,650,567 | 9/1953 | Whitworth .......................... 119/99 |
| 2,804,046 | 8/1957 | Turner ................................. 119/99 |
| 2,991,755 | 7/1961 | Ekren et al. ..................... 119/99 X |
| 3,399,654 | 9/1968 | Schroer ............................... 119/96 |

Primary Examiner—Hugh R. Chamblee
Attorney, Agent, or Firm—Pravel & Wilson

[57] ABSTRACT

A cage apparatus for housing animals such as felines having a movable side wall being lockable in a particular position therewithin for restraining such felines.

9 Claims, 3 Drawing Figures

CAGE APPARATUS

BACKGROUND OF THE INVENTION

The field of this invention is animal cages, particularly of the type used for temporarily restraining animals, such as felines.

In the care of animals such as medium size exotic felines usually found in zoological parks, it is necessary to temporarily restrain the movement of these animals for various purposes such as medication, vaccination, or wound treatment. Since such animals may be very dangerous to handle, it is necessary to somehow provide access to the animal's body without endangering the handler. Presently, devices such as nets or catchboxes are laborious to use and expose the handler to dangerous contact with the animals. Anesthetized dart guns reduce the risk to the handler but substantially increase the risk of injury to the valuable animal.

SUMMARY OF THE INVENTION

The present invention relates to a new and improved animal cage having a movable side wall which moves towards a fixed side wall and is lockable in various positions to temporarily restrain a caged animal such as a feline. The cage apparatus of this invention includes a housing having a top, a bottom, a front wall, a rear wall, a movable side wall, and a fixed side wall for confining the animal. The movable side wall is rollably mounted for movement within the housing towards the fixed side wall. A restraint mechanism is operably connected with the movable side wall for restraining and thereafter locking the animal within the housing.

DESCRIPTION OF THE PREFERRED EMBODIMENT

Figure 3:
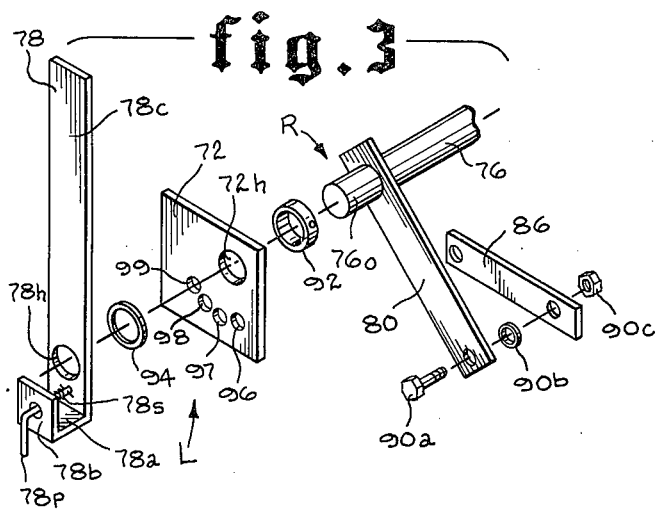
FIG. 3 is an assembly view of the side wall locking means of this invention.

Referring to the drawings, the letter C designates the cage apparatus of the preferred embodiment of this invention. The cage apparatus C includes a housing H having a restraint means R and a locking means L therewith for restraining and thereafter locking the animal within the housing H.

The cage apparatus C includes a housing H having a top portion 10, a bottom portion 12, a front wall 14, a rear wall 16, a movable side wall 18, and a fixed side wall 20 forming a generally rectangular housing H as connected by a structural framework 22. The structural framework 22 includes structural front frame members 22d, 22e, 22i, 22g, 22h, and 22f, rear frame members 22m, 22n, 22b and 22k, side frame members 22a, 22c, 22l, and 22j, which are welded together to provide the box-like shape illustrated in the drawing.

Supporting the structural framework 22 of the housing H are wheels 24 mounted by axles 25 to brackets 26 which are affixed to structural members 22a, 22l adjacent the rear wall 16. Cushion supports 28 as disclosed in U.S. Pat. No. 3,785,344, are affixed to member 22e by appropriate bolt connectors 30. Frame members 22d and 22f extend downwardly below members 22a and 22l. Member 22e is affixed to the lower end of members 22f, 22d in such a fashion that the cage apparatus C remains in a substantially horizontal position when wheels 24 and cushion supports 28 are at rest. Thus, the cage apparatus C may be moved about by a handler lifting the end of the housing H adjacent the front wall 14 and utilizing the wheels 24 to rollably support the end adjacent the rear wall 16 to rollably move the cage apparatus C thereabout. Members 22h provide additional support for the portions of members 22d, 22f extending below members 22a, 22l.

The bottom portion 12 is affixed by welding to members 22a, 22g, 22l, 22n for support thereof. In similar fashion, the top portion 10 is affixed thereon members 22c, 22i, 22j, 22m and 22o with member 22o being substantially transverse to side walls 18, 20 and central to the top portion 10. Both the top portion 10 and the bottom 12 are preferably formed of any suitably rigid flat plate, of aluminum, stainless steel plate, or the like.

The front wall 14 is generally defined by front wall members 14a, 14b, 14c, 14d. Front wall bars or rods 32 are mounted with the front wall 14 with members 14e, 14f, 14c with member 14f providing central support for the bars 32 and members 14e, 14f providing a top and bottom support respectively, for the bars 32. A pin receiver 34 having a hole 34a therein is affixed to member 14e of the front wall 14, the purpose of which will be described hereinbelow. The front wall 14 is mounted with the housing H by front wall channels or tracks 36, 38. Front wall channel 36 is mounted by welding or otherwise with member 22d such that the lower end is substantially flush with the bottom portion of member 22g and extending uppwardly therefrom and above the top portion 10 of the housing H. In similar fashion, front wall channel 38 is affixed to member 22f with the lower end being flush with the lower portion of member 22g, extending upwardly therefrom and above the top portion of the housing H. The front wall channels 36, 38 have preferably interior "U-shaped" channel inner surfaces 36a, 38a, respectively, adapted to receive front wall members 14b, 14d therewith. Thus, the front wall 14 is mounted for slidable movement vertically with respect to the cage apparatus C of the present invention in the front wall channel 36, 38. Front wall stop 40 mounted with member 22g limits the downward vertical movement of the front wall 14 as positioned in the front wall channels 36, 38.

In similar fashion, the rear wall 16 includes rear wall members 16a, 16b, 16c, 16d, which describe the perimeter of the rear wall 16 and members 16e, 16f providing top support and central support, respectively, for rear wall bars or rods 42. Rear wall channels 44, 46 are affixed by welding or otherwise to members 22b, 22k respectively, and adapted to slidably receive the rear wall members 16d, 16b, respectively in inner "U-shaped" channel portions 44a, 46a. A rear wall stop (not illustrated) similar in configuration to front wall stop 40 is attached to member 22n to limit the downward vertical movement of the rear wall 16. Rear wall pin receiver 48 is mounted with member 16e in similar fashion as front wall pin receiver 34 is mounted with front wall member 14e.

The fixed side wall 20 is generally defined by members 22f, 22j, 22k, 22l having bars or rods 50 removably mounted therewith. A plurality of spaced holes 52 in member 22j are aligned with spaced holes 54 in a central support member 20c of the fixed side wall 20, and with spaced recess of seals 56 in member 22l to receive the bars 50. The bars 50 are then removably mounted in the side wall 20. It will be appreciated that the recess or seats 56 are formed only partially through member 22*l* thus limiting the lower vertical travel of bars 50 as it seats in member 22*l*. The bars 50 are longer than frame member 22*k* so that an upper portion 50*a* of the bars 50 extend upwardly from the top wall 10 to provide the handler with gripping areas removed from the sides 20. Upon grasping the upper portion 50*u* of the bars 50, the bar 50 may be removed by lifting upwardly and outwardly from holes 56, 54, 52, respectively. Conversely, the bars 50 may be replaced by inserting the bar 50 through appropriately aligned holes 56, 54, 52, respectively.

Figure 1:
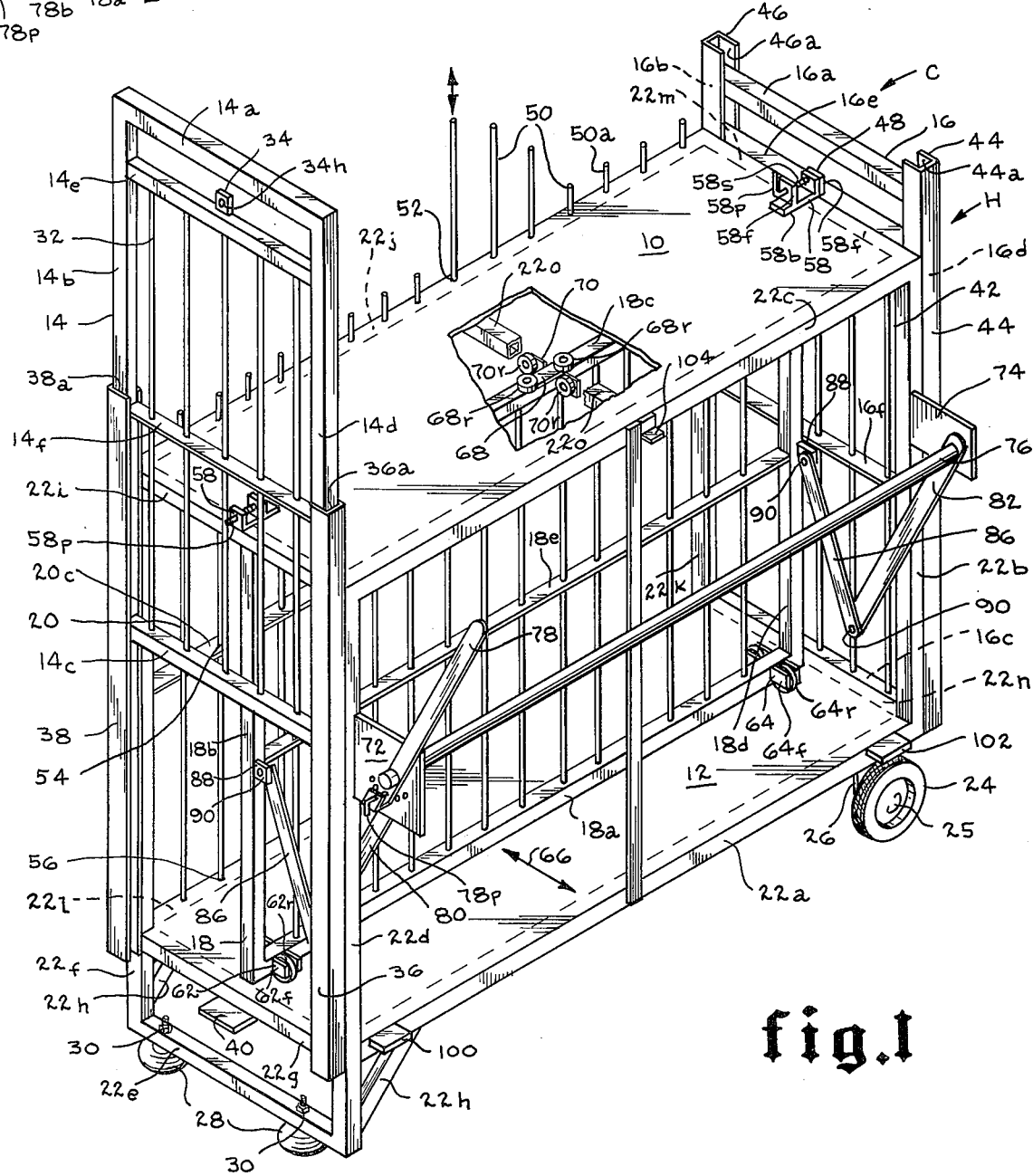
FIG. 1 is an isometric view of the cage restraining apparatus of the preferred embodiment of this invention.

Pin mechanisms 58 are provided for locking the front and rear doors 14 and 16 in a down or closed position. The pin mechanisms 58 are mounted on front frame member 22*i* and rear frame member 22*m* for inserting a lock pin 98*p* into lugs 34 and 48 mounted on doors 14 and 16, respectively. Each pin mechanism includes a base 58*b*, upstanding flanges 58*f*, 58*f'* adapted to receive a pin 58*p*, and a spring 58*s*. The base 58*b* of the pinning mechanism 58 is mounted with the top portion 10 adjacent the front wall 14 and the rear wall 16. Upstanding flanges 58*f*, 58*f'* locate the pin 58*p* and spring 58*s* such that the spring 58*s* resiliently returns pin 58*p* to an outwardly extending position. It will be appreciated that the pin 58*p* preferably has a straight portion (not numbered) adapted to be mounted within the flanges 58*f*, 58*f'* and an upstanding pin portion (not numbered) for ease in actuating the pin 58*p*. As illustrated in FIG. 1 adjacent the rear wall 16, the pin mechanism 58 is shown in a locked position with the rear wall 16 in a lowered vertical position. In this position, the pin 58*p* extends through flanges 58*f*, 58*f'* and into the hole (not shown) in rear wall pin receiver 48 to be in lockable engagement therewith, thus preventing upward vertical movement of the rear wall 16. By forcing the pin 58*p* of the pinning mechanism 58 adjacent the rear wall 16 towards the front wall 14, the pin 58*p* will move out of engagement of the hole (not shown) of rear wall pin receiver 48, allowing vertical movement of the rear wall 16 to a position similar to front wall 14 as shown in FIG. 1.

The pin 58*p* can also be used to support the front wall 14 or rear wall 16 in half-open or fully open positions. For example, the pin 58*p* adjacent the front wall 14 can support the front wall 14 in a half-open position by engaging the underside of frame member 14*f* and can support the front wall 14 in a fully open position by engaging the underside of the bottom door frame member 14*c*.

The movable side wall 18 has members 18*a*, 18*b*, 18*c*, 18*d*, forming the frame perimeter face of the movable side wall 18 and a central member 18*e*. Movable side wall bars 60 are rigidly mounted with members 18*a*, 18*e*, 18*c* by welding or other suitable means. A first roller assembly 62 and a second roller assembly 64 are mounted with member 18*a* parallel to and adjacent of front wall 14 and rear wall 16 respectively. The roller assemblies 62 and 64 include flanges 62*f*, 64*f* which are affixed to member 18*a* for mounting rollers 62*r*, 64*r*, respectively, therewith. The roller assemblies 62, 64 act to movably support the movable side wall 18 upon the bottom portion 12 of the housing H to facilitate side to side movement of the movable side wall 18 in a direction as designated by arrow 66.

Figure 2:
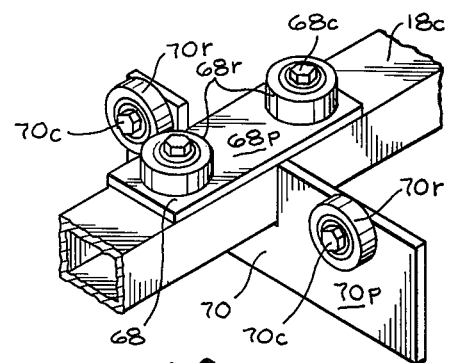
FIG. 2 is an enlarged view of the roller support assembly for the movable side wall.

As best shown in FIGS. 1 and 2, third and fourth roller assemblies 68, 70, respectively, are affixed to top side wall frame member 18*c*, centrally thereof. The third roller assembly 68 is mounted on the movable side wall 18 and includes rollers 68*r* mounted on plate 68*p* by appropriate bolt connectors 68*c*. The plate 68*p* is affixed to member 18*c* centrally thereof and along the member 18*c*, such that the rollers 68*r* engage the vertical or side portions (not numbered) of frame member 22*o*. This rollable engagement of the rollers 68*r* with the member 22*o* permits aligned movement in the directions designated by arrow 66 while limiting lateral wandering of the movable side wall 18 with respect to the arrow 66, front wall 14, and rear wall 16. This substantially insures that the movable side wall 18 will remain centered and aligned within the housing H of the cage apparatus C.

The fourth roller assembly 70 includes rollers 70*r* rollably mounted to mounting plate 70*p* by appropriate connectors 70*c*. The plate 70*p* is affixed transversely and edgewise to member 18*c* in such a fashion that rollers 70*r* extend partially above the surface of plate 68*p*. This allows the rollers 70*r* to contact the lower horizontal portion of member 22*o* and rollably engage the same without the plate 68*p* frictionally engaging the same. Furthermore, the rollers 70*r* being in spaced relation to the vertical side portions of member 18*c*, support the movable side wall 18 in an upright position to help to prevent the movable side wall 18 from toppling either towards or away from the fixed side wall 20.

As shown in FIGS. 1 and 3, the restraint means R includes a locking plate 72, a mounting plate 74, a shaft 76, a handle 78, first and second laterally spaced pivot members 80, 82, first and second pivot arms 84, 86 and supporting fingers 88. the locking plate 72 is mounted on member 22*d* while mounting plate 74 is similarly mounted on member 22*b* such that hole 72*h* in the locking plate 72 is aligned with a similar hole (not numbered) in the mounting plate 74. The shaft 76 having first and second laterally spaced pivot members 80, 82 therewith is inserted through the hole 72*h* in the locking plate 72 and the hole (not numbered) in mounting plate 74. The first and second laterally spaced pivot members 80, 82 are then mounted for rotation with the shaft 76. Connector pins 90 join the first and second laterally spaced pivot members 80, 82 with the first and second pivot arms 84, 86, respectively, to allow pivotal movement therebetween. In similar fashion, the first and second pivot arms 84, 86 are rotatably connected to supporting fingers or lugs 88 welded to members 18*b*, 18*d*, respectively of the movable side wall 18. As shown in FIG. 3, the pivotal connection 90 includes a bolt 90*a*, washer 90*b*, and nut 90*c* or any other suitable pivotal connection means. A spacer collar 92 is preferably placed on the shaft 76 between the locking plate 72 and the first laterally spaced pivot member 80 as will be described hereinbelow. End portion 76*o* of the shaft 76 extends from the plate 72 after being placed through hole 72*h* and has a washer 94 placed thereon followed by the handle 78 having a hole 78*h* formed therewith for mounting over shaft end portion 76*o*, the handle 78 being mounted for rotation with the shaft 76.

The handle 78 has the locking means L formed therewith. The handle 78 includes end portion 78*a* and side portion 78*b* integrally formed with the main handle portion 78*c*. Aligned holes (not numbered) in members 78*b*, 78*c* allow proper mounting of locking pin 78*p* with a spring 78s to resiliently restrain and return the pin 78p to a proper position. A plurality of circumferentially disposed holes 96, 97, 98, 99 and plate 72 are adapted to receive the pin 78p of the handle 78. The holes 96–99 allow the handle 78 to be locked in multiple fixed positions with respect to the locking plate 72.

Movement of the handle 78 acts upon the shaft 76 to rotatably actuate the first and second laterally spaced pivot members 80, 82 outwardly from the housing H. Such action of the first and second laterally spaced pivot members 80, 82 correspondingly actuate first and second pivot arms 84, 86 hence withdrawing the movable side wall 18 into its outermost position which parallels the plane described by members 22a, 22b, 22c, 22d. In this position, the rollers 62r, 64r, and 68r which do not face the fixed side wall 20 extend beyond the housing H of the cage apparatus C whereupon supporting tabs 100, 102, 104 provide engaging surfaces for rollers 62r, 64r, and 68r that so outwardly extend. From this position of the handle 78 having the pin 78p so mounted in hole 96, if the pin 78p is retracted, the handle 78 can rotatably be moved to multiple positions with the pin 78p being adapted to be inserted into either holes 97, 98, 99, or any number of holes thereafter. Such movement of the handle 78 from pin positions in holes 96 to 99 effectuates a corresponding motion of the movable side wall 18 towards the fixed side wall 20 and a correspondingly smaller volume of space therebetween the fixed side wall 20 and the movable side wall 18.

In the use or operation of the form of the invention illustrated in FIGS. 1–3, the cage apparatus C of the present invention is adapted to be used for restraining animals such as felines for various purposes such as medication, vaccination, or wound treatments. Preferably, the movable side wall 18 should be in an outermost position corresponding to pin 78p being affixed in hole 96 of the locking plate 72. Depending upon the size of animal to be constrained, the front wall 14 should be either lifted ro a half and/or full position to allow entrance of the animal into the cage apparatus C. With the animal so released into the cage apparatus C, the front wall is lowered such that member 14c rests upon front wall stop 40 and the pinning mechanism 58 lockably engages pin receiver 34 to prevent inadvertent opening of the front wall 14. The rear wall 16 should also be in such a locked position with the pinning member 58 also lockably engaging rear wall pin receiver 48.

With the animal thus within the housing H of the cage apparatus C, pin 78p is released from its position in hole 96 and the handle 78 is rotated in such a fashion to result in movement of the movable side wall 18 towards the fixed side wall 20. Movement of the handle 78 should continue until the animal is constrained between movable side wall 18 and fixed side wall 20 such that it may not move about. At this position, the pin 78p is released and inserted into one of the plurality of holes, such as hole 99 thus locking the movable side wall 18 in the appropriate restraining position. With the animal so restrained, a single or several bars 50 may be removed from the fixed side wall to expose the area of the animal requiring attention without exposing the handler to any unnecessary risks or dangers or the animal to injury. After completing the necessary treatment, the bars 50 are to be reinserted. Then the pin 78p is withdrawn from hole 99 and the handle 78 is moved in an opposing direction such as to expand the movable side wall 18 away from the fixed side wall 20 to such a position where the pin 78p is capable of being reinserted into hole 96. Thereafter, the animal may be released from the cage apparatus C by upward vertical movement of either the rear wall 16 or the front wall 14.

The foregoing disclosure and description of the invention are illustrative and explanatory thereof, and various changes in the size, shape, and materials as well as in the details of the illustrated construction may be made without departing from the spirit of the invention.

I claim:

1. A cage apparatus for housing animals such as felines, comprising:
   a housing including a top, a bottom, a front wall, a rear wall, a momvable slide wall, and a fixed side wall, providing an enclosed area for confining such felines;
   roller means mounted with said movable side wall, for supporting same for movement within said housing;
   restraint means connected with said movable side wall for moving said movable side wall toward said fixed side wall for restraining such animal within said housing;
   locking means for locking said movable side wall in various fixed positions with respect to said fixed side wall;
   a central support member mounted with said top of said housing; and
   a roller assembly mounted with said movable side wall for engaging said central support to position and support said movable side wall in an aligned and uprignt position.

2. The cage apparatus of claim 1, wherein said fixed side wall includes:
   a plurality of removable bars for exposing a body area of such restrained feline for treatment or the like.

3. The cage apparatus of claim 1, further including:
   means for vertically adjusting said front wall with respect to said housing; and
   means for vertically adjusting said rear wall with respect to said housing.

4. The cage apparatus of claim 1, wherein said roller means includes:
   first and second roller assemblies mounted with said movable side wall for engaging said bottom of said housing and rollably supporting said movable side wall.

5. The cage apparatus of claim 4, further including:
   supporting tabs mounted with said bottom of said housing adjacent said movable side wall, said tabs extending outwardly therefrom said bottom of said housing for supporting said first and second roller assemblies when said movable side wall is in an initial, unrestraining position.

6. The cage apparatus of claim 1, wherein said restraint means includes:
   first and second laterally spaced pivot members pivotally mounted with said movable side wall, said first and second laterally spaced pivot members being adjacent to said front wall and said rear wall respectively;
   a shaft mounted with said housing for rotation with respect to said housing;

a handle mounted with said shaft; and first and second arms mounted with said shaft and pivotally mounted with said first and second laterally spaced pivot members respectively whereby rotation of said handle causes actuation of said first and second arms and pivot members for moving said movable side wall.

7. The cage apparatus of claim 6, wherein said locking means includes:

said handle being mounted adjacent to a locking plate, said locking plate having a plurality of circumferentially spaced openings therein for receiving a position locking pin for engaging and locking said handle in a particular position thereby locking and limiting the position of said movable side wall.

8. The cage apparatus of claim 1, wherein:

said roller assembly for engaging said central support includes locating rollers for preventing lateral movement of said movable side wall; and a fourth roller assembly for supporting said movable side wall in an upright position.

9. The cage apparatus of claim 8, wherein:

said central support member is positioned with said top substantially transverse to said side walls and central to said top of said housing.

* * * * *